United States Patent Office

3,752,745
Patented Aug. 14, 1973

3,752,745
RECOVERY OF METAL VALUES FROM OCEAN FLOOR NODULES
William S. Kane, Newport News, and Paul H. Cardwell, Zanoni, Va., assignors to Deepsea Ventures, Inc., Gloucester Point, Va.
Filed May 12, 1971, Ser. No. 142,697
Int. Cl. C22d 5/08, 5/18, 5/30
U.S. Cl. 204—105 M      19 Claims

ABSTRACT OF THE DISCLOSURE

Method for recovering metal values from ocean floor nodules of the type containing iron, manganese, copper, cobalt, and nickel, comprising grinding the nodules into particles, hydrochlorinating to obtain metal chlorides as reaction products, converting the iron chloride to iron oxide, leaching the reaction products, removing the iron oxide, separating the copper chloride, nickel chloride, and cobalt chloride solutions from the manganese chloride solution by means of liquid ion exchange and recovering the metal values by electrolyzing or by aluminothermal reduction.

BACKGROUND OF THE INVENTION

(1) Field of the invention

A great deal of recent attention has been directed to the harvesting of ocean floor nodules and extraction of their principal metal values including manganese, copper, cobalt, and nickel. Earlier inventors have attempted removal of one or more of these metal values but, apparently, have been unable to isolate and remove selectively the manganese, copper, cobalt, and nickel values. Also, industries have hydrochlorinated ores so as to remove nickel, cobalt, and manganese. However, these processes have been mostly restricted to removal of one or, at the most, two of these metals, the raffinate or residue having been discarded as waste.

(2) Description of the prior art

The following single prior art reference has been developed:
Treatment of Nodules (Pat. No. 3,169,856). According to 3,169,856, the nickel and copper in the manganese phase of the nodules are leached out by gases, such as sulphur dioxide or nitrogen dioxide exposed to a slurry of crushed nodules and water. When the slurry is thus exposed to the gas, the managanese, along with the nickel, copper, and other mineral elements bound up in the manganese phase of the ore, will go into solution in accordance with a "leaching curve" (FIG. 1 of the Mero patent). Sequentially, the iron, along with the cobalt bound up in the iron phase, is leached out. Apparently, there is no provision for removal of the metal values independently.

SUMMARY OF THE INVENTION

According to the present invention, not only the nickel and copper values, but, also, the cobalt value is removed separately from the reaction mass by liquid ion exchange and concentrated by electrolysis. The remaining raffinate containing manganese may be purified by sulfide precipitation and concentrated by crystallization prior to electrolysis.

The nodules are first ground, then hydrochlorinated so as to produce as reaction products chlorides of manganese, copper, nickel, cobalt, and iron.

Water vapor is then flowed against the nodules so as to convert the iron chloride to iron oxide. The reaction mass is then leached, and the iron oxide removed by filtering.

The pregnant leach liquor is then injected with a liquid ion exchange reagent for copper, so as to isolate copper in solution, and sequentially of the ion exchange the copper solution is stripped, while leaving a raffinate of maganese, nickel, and cobalt values. The copper solution is then electrolyzed. After this, the nickel and cobalt values are removed and separated by liquid ion exchange. The nickel and cobalt solutions are separately electrolyzed. Then the raffinate solution containing manganese may be attacked in any of several ways. For example, the manganese chloride is purified by sulfide precipitation and concentrated by evaporation and crystallization prior to electrolyzation. The manganese chloride can be electrolyzed within a fused salt cell to produce molten manganese.

DESCRIPTION OF THE PREFERRED EMBODIMENTS

Figure 1:
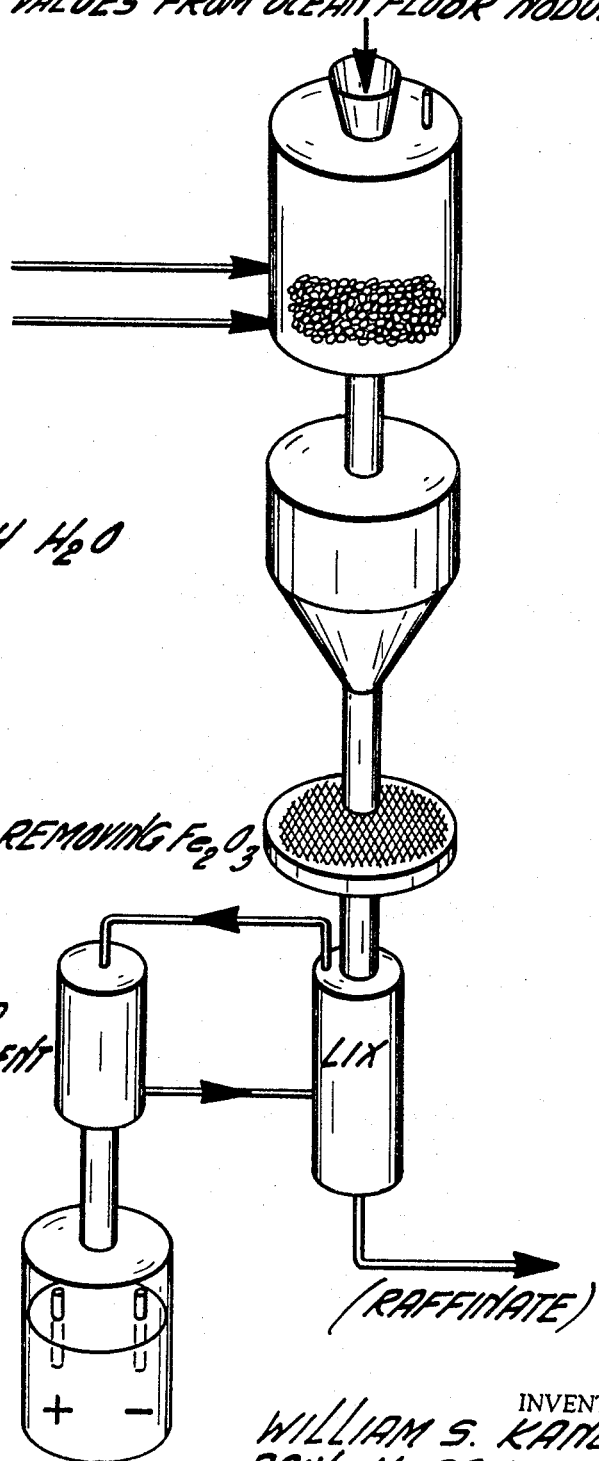
FIG. 1 is a schematic representation of applicants' method of recovering metal values.
Figure 2:
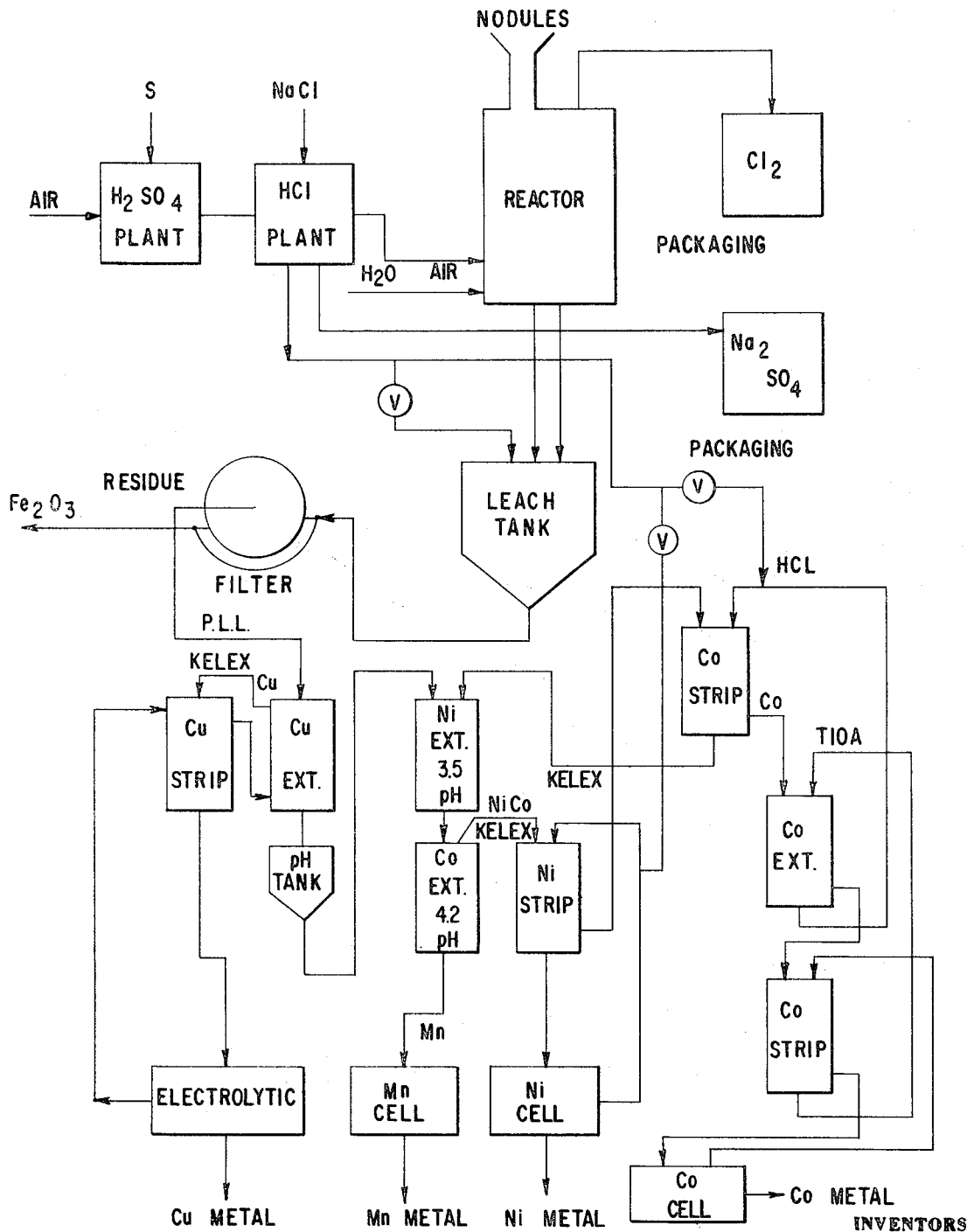
FIG. 2 is a flow sheet, entitled, Hydrochlorination Process.

As illustrated in FIG. 2, the ground nodules are reacted with hydrogen chloride gas. This can be done in a fluid-solid reactor such as a fluid bed, a shaft furnace, a multi-hearth furnace, or a rotating type furnace. The reaction is carried out at a temperature above 110° C. and, preferably, below about 600° C. It is desirable to prevent the volatilization of iron chloride. The preferred temperature range is 125° to 550° C. The time for the reaction is fifteen minutes to an hour, depending upon the particle size of the ground nodule. It is important that the reaction be carried out at a temperature above the boiling point of hydrochloric acid to ensure no liquid water being present in the reaction chamber.

Since the nodule contains manganese dioxide which must be converted to divalent manganese in order to obtain a soluble form, the hydrochlorination process accomplishes this conversion and, at the same time, produces chlorine. Thus, this process is a means of producing chlorine from hydrogen chloride and, at the same time, converting the tetravalent manganese to the desirable soluble divalent form.

Following the hydrochlorination reaction, the reacted product is treated with water vapor in a stream of air or chlorine. The purpose of this is to convert the chlorinated iron in the nodule to iron oxide. This reaction can be carried out in conjunction with the hydrochlorination fluid-solid reactor or in a separate reactor. The requirements are that the hydrogen chloride content of the gas phase below and the temperature of the reaction be maintained at 200° to 400° C., the preferred temperature being about 300° C. The concentration of the water vapor is not critical. We have found a water-saturated air or chlorine mixture to be satisfactory.

Following the reaction with water vapor, the reaction mass is leached with water. This water can be either that from the manganese chloride production step if a fused salt electrolysis opeartion is used for manganese metal production or that from the aqueous electrolysis if this method is used for manganese metal production. The leaching is conducted at ambient temperature. A batch leaching technique can be used, as well as a counter-current, continuous system or a thickener.

EXAMPLE 1

Using nodules containing 20.0% manganese, 6.5% iron, 0.88% nickel, 0.55% copper, and 0.12% cobalt ground to less than 100 mesh in two hours tests in a 300°

Figure 3:
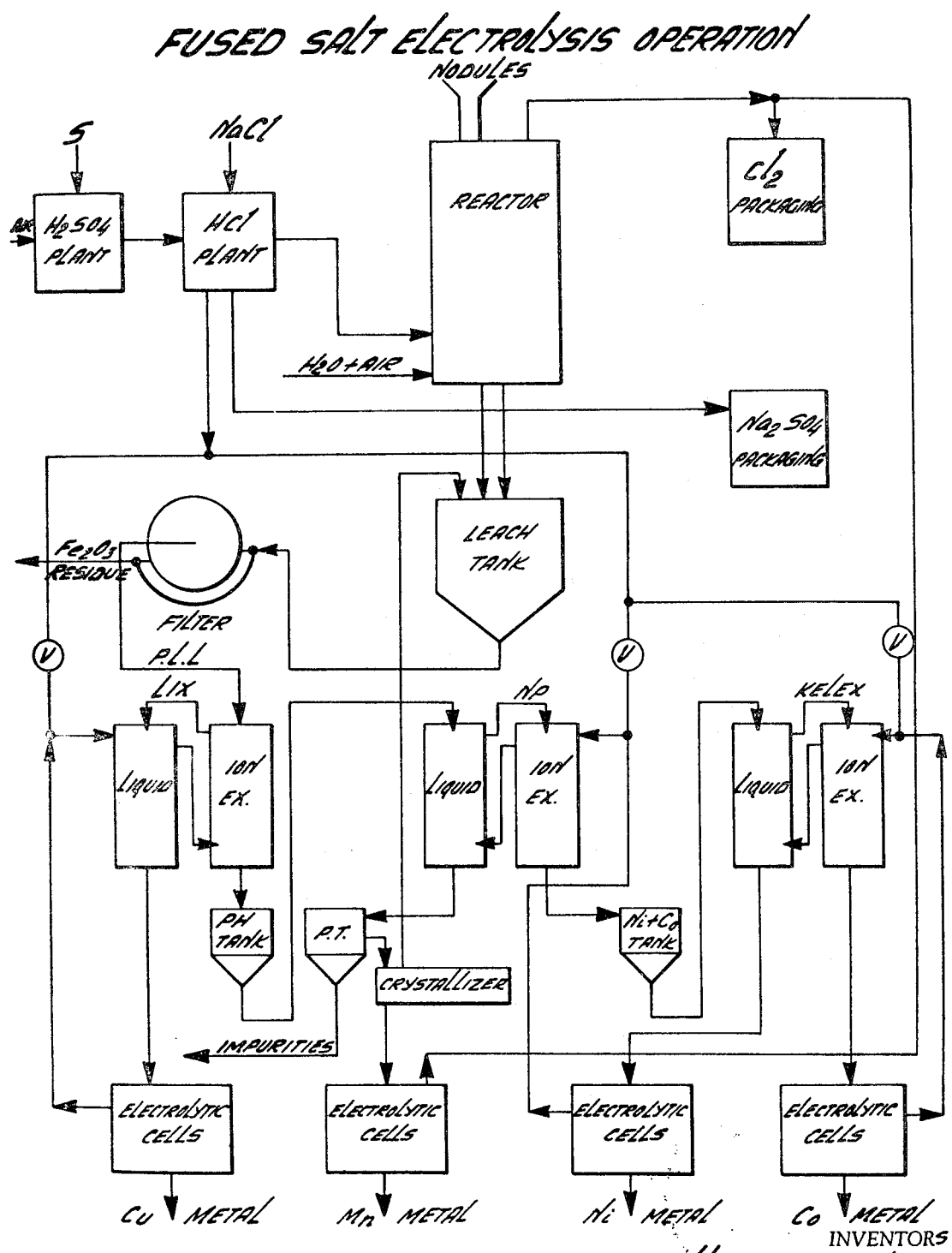
FIG. 3 is a flow sheet, entitled, Fused Salt Electrolysis Operation.

C. furnace, with 2.5 grams of the nodules exposed to 4 standard cubic feet per hour of hydrogen chloride, the following results were obtained, after leaching with water, and as illustrated in FIG. 3.

| Water vapor after hydrogen chloride | Leach pH | Percentage dissolved | | | | |
|---|---|---|---|---|---|---|
| | | Manganese | Iron | Nickel | Copper | Cobalt |
| None | 1.9 | 94 | 27 | 100 | 96 | 100 |
| 15 minutes water saturated air | 3.5 | 79 | 0 | 84 | 70 | 90 |
| Do | 7.2 | 82 | 0 | 86 | 42 | 99 |

The above results show the value of the treatment with water vapor to prevent the leaching of iron as well as the importance of leaching with water having a pH in the neighborhood of 2 in order to dissolve the copper chloride. At a higher pH, the copper chloride hydrolyzes, resulting in it not dissolving.

The pregnant leach liquor containing the chlorides of manganese, nickel, cobalt, copper and other impurities is subjected to liquid ion exchange. The first operation of this type is copper extraction. This is accomplished by contracting in a counter-current operation the pregnant leach liquor with an organic liquid such as kerosene or other petroleum liquids containing an ion exchange reagent such as (1) Kelex a commercial material manufactured by Ashland Chemical Company, a Division of Ashland Oil and Refining Company or (2) LIX, commercial materials manufactured by General Mills, Inc.

These materials are organic substances that contain, as we understand, a chelating functional group which in the case of LIX is nitrogen containing.

EXAMPLE 2

In a test with a leach liquor containing manganese chloride (60 grams per liter as manganese) copper chloride (0.405 gram per liter as copper), nickel chloride (2.94 grams per liter as nickel) and cobalt chloride (0.565 gram per liter as cobalt) was extracted with 10% LIX 64N in Napoleum, it was found that in 5 stages of counter-current operation at an organic to aqueous ratio of 6 to 31.5 by volume, the copper content of the aqueous phase was 0.001 gram per liter. The amount of manganese, nickel and cobalt extracted by the organic phase was not detectable.

The liquid ion extraction for copper is carried out starting with an aqueous solution at a pH in the neighborhood of 2.

Following the extraction, the copper is stripped from the Kelex or LIX by the acid solution generated in the copper aqueous electrolysis operation. The aqueous copper containing solution becomes the feed to electrolysis cell for metal produciton. The organic solution depleted of copper is returned to the extraction operation.

As illustrated in FIG. 2, the aqueous solution from which the copper has been removed (so-called copper raffinate) is adjusted to a pH of 3 to 10 with the preferred range being pH 4 to 6. The resulting solution is contacted with a solution of Kelex in kerosene. We have used, usually, a 10% solution in Napoleum, a petroleum fraction from Kerr-McGee Corporation. Other concentrations can be used. At times, it is desirable to add isodecanol to the Kelex-Napoleum solution as a phase modifier, and up to 30% can be added. This extraction removes nickel and cobalt from the manganese. The nickel and cobalt is picked up by the Kelex, leaving manganese in the aqueous phase.

A material which can be used in place of Kelex in the Napoleum solution is naphthenic acid. We prefer Kelex although naphthenic acid is a satisfactory material to use.

We have found that by the selection of the pH, it is possible to extract the nickel and cobalt in the same ratio as they are present in the aqueous solution. For example, from a solution containing nickel chloride (2.94 grams per liter as nickel) and cobalt chloride (0.565 gram per liter cobalt) at a pH of 4.2, the nickel and cobalt will be extracted in the ratio of 2.94 grams nickel to 0.565 gram cobalt. At a pH below 4.2, the extraction will give a material richer in nickel than the ratio of 2.94 parts nickel to 0.565 part cobalt. At a pH above 4.2, the extraction will give a material richer in cobalt. Thus, by selection of the pH, various ratios of nickel and cobalt found in the nodules can be extracted and still maintain the same ratio in the extracted solutions.

EXAMPLE 3

Using the aqueous solution from Example 2 (the copper raffinate), the solution was adjusted to different acidities as given in the following table, and the solutions were contacted with a 10% Kelex in Napoleum at a ratio of one volume of organic to 2 volumes of aqueous. The tests were one stage operations. In these tests the extraction factors ($E_{metal}$) were determined.

$$E_{metal} = \frac{\text{Weight of metal in organic phase}}{\text{Weight of metal in aqueous phase}}$$

| pH | $E_{Mn}$ | $E_{Ni}$ | $E_{Co}$ | $E_{Co}/E_{Ni}$ |
|---|---|---|---|---|
| 7.1 | 0.0075 | 3.7 | 11.1 | 3.0 |
| 6.3 | 0.0037 | 7.25 | 13.0 | 1.8 |
| 5.6 | 0.0015 | 6.52 | 8.2 | 1.25 |
| 4.0 | 0.00014 | 1.84 | 0.16 | 0.08 |

As illustrated in FIG. 3, the nickel and cobalt are stripped from the organic Kelex solution by the acid solution generated in the nickel electrolysis operation. This solution contains 10% ammonium chloride. Since the acid content of the electrolyte solution from the electrolysis is equivalent to the nickel, acid has to be added equivalent to the cobalt in order to strip both the nickel and cobalt from the Kelex organic solution.

The Kelex-organic solution following the stripping is returned to the extraction operation. The aqueous solution now containing only the metal ions of nickel and cobalt is adjusted to a pH of 9.0 to 9.5. The solution is extracted again with Kelex in a petroleum liquid. In this extraction cobalt is removed from the nickel.

The manganese is in the raffinate from the nickel and cobalt extraction. A sulfide precipitation may be made upon this solution to remove any impurities following which manganese metal is produced. The manganese chloride produced from the aqueous solution can go directly to the fused salt cell. In the fused salt cell, molten manganese is produced by the reduction with magnesium which is formed at the cathode.

The nickel and cobalt aqueous cell may be of the type wherein the following reactions are separately carried out:

$NiCl_2 \rightarrow Ni + Cl_2$
$CoCl_2 \rightarrow Co + Cl_2$

EXAMPLE 4

Using nodules containing 27.7% manganese, 1.30% nickel, 1.06% copper, 0.26% cobalt, and 6.03% iron ground to pass a 35 mesh screen, in a single hearth furnace at 500° C. for two hours with eight pounds of nodules exposed to 90 standard cubic feet per hour of hydrogen chloride, the following results were obtained, upon leaching with water:

Leach pH 2:                             Percentage dissolved
Manganese ------------------------------ 94.0
Iron ---------------------------------- 0.0
Nickel -------------------------------- 97.4
Copper -------------------------------- 96.1
Cobalt -------------------------------- 97.6

As illustrated in FIG. 2, the pregnant leach liquor obtained by leaching with water, the hydrochlorinated nodules of Example 4, containing manganese chloride (200 grams Mn/liter), nickel chloride (9.46 grams Ni/liter), copper chloride (7.68 grams Cu/liter), cobalt chloride (1.83 grams Co/liter), and other impurities, is subjected to liquid ion exchange after filtering.

The first operation of this type is copper extraction. This is accomplished by contacting in a counter-current operation the pregnant leach liquor with an organic liquid such as kerosene or other petroleum liquids containing an ion exchange reagent such as (1) Kelex 100 or Kelex 120 commercial materials manufactured by Ashland Chemical Company, a Division of Ashland Oil and Refining Company, or (2) LIX 63, LIX 64, or LIX 64N commercial materials manufactured by General Mills, Inc.

These materials are organic substances that contain, as we understand, a chelating functional group which in the case of LIX is nitrogen containing.

The liquid ion extraction for copper is carried out starting with an aqueous solution at a pH in the neighborhood of 2.

Following the extraction, the copper is stripped from the Kelex or LIX by the sulfuric acid solution generated in the copper aqueous electrolysis operation. The resulting aqueous copper containing solution becomes the feed to electrolysis cell for metal production. The organic solution nearly depleted of copper is returned to the extraction operation.

The aqueous solution from which the copper has been removed (so-called copper raffinate) is adjusted to a pH of 3.5 to 5.5 with the preferred point being pH 3.5. The resulting solution is contacted with a solution of Kelex 100 in kerosene. We have used, usually, a ten percent solution in Napoleum, a petroleum kerosene fraction from Kerr-McGee Corporation. Other concentrations can be used. At times, it is desirable to add isodecanol to the Kelex-Napoleum solution as a phase modifier and up to thirty percent can be added. The extraction of pH 3.5 removed mainly nickel with some cobalt. Following the nickel extraction, the aqueous raffinate is adjusted to pH of 4.2 to complete the cobalt extraction. Alkali has to be added to the aqueous solution to maintain these pH acidities.

It is desirable all times to operate the first portion of the extraction train at a pH of 3.5 and the last portion at a pH of 4.2. Sometimes, it is possible to operate the extraction within the range of pH 3.0 and 4.2. This is accomplished by adjusting the copper raffinate solution to a pH of 4.2 and allow the pH to decrease to a pH of 3.0 before alkali addition. In this method of operation, the cobalt being extracted at a pH of 4.2 decreases the pH to 3.5 at which point nickel is extracted, lowering the pH to 3.0. The addition of alkali (sodium hydroxide or ammonium hydroxide) returns the pH to 4.2 and the cycle is repeated until the nickel and cobalt are all extracted.

The nickel and cobalt are separately stripped from the organic Kelex solution. The nickel is stripped first, using the solution generated in the nickel electrolysis operation to which has been added three to twenty percent hydrochloric acid. The resulting strip solution is the feed to the nickel aqueous electrolysis cells.

We have found that the cobalt is not stripped from the Kelex solution by this concentration of hydrochloric acid, thus, we obtain a good separation of nickel from cobalt.

The cobalt containing Kelex solution is contacted with a solution containing in excess of twenty percent hydrochloric acid content. Such a solution will strip the cobalt from the Kelex, and the metal depleted Kelex-kerosene solution is returned to the extraction operation. It is desirable to carry out this stripping operation at a temperature of 30 to 50° C. in order to minimize the amount of hydrochloric acid taken up by the Kelex solution.

The cobalt-hydrochloric acid solution is contacted with a triisooctylamine-kerosene solution which reextracts the cobalt. The TIOA solution contains ten percent TIOA, twelve percent isodecanol, and the remainder is kerosene. The cobalt is stripped from the TIOA solution using the nearly depleted cobalt solution from the aqueous cobalt electrolysis.

The manganese is in the raffinate from the nickel and cobalt extraction. A sulfide precipitation may be made upon this solution to remove any impurities following which manganese chloride is obtained by evaporization and crystallization. The resulting manganese chloride, after drying, can go directly to the fused salt cell. In the fused salt cell, magnesium is formed at the cathode which then reacts with manganese chloride to reform the magnesium chloride and manganese metal. The manganese metal is removed from the cell as molten metal. Aluminum chloride can be used in place of magnesium chloride in the cell.

Both nickel and cobalt can be deposited upon nickel and cobalt starter sheets used as cathodes.

Manifestly, variations in hydrochlorinating, leaching, stripping, purifying, and electrolyzing may be employed without departing from the claims.

Instead of flowing water vapor, the reaction products may be leached with water, so as to obtain a pregnant leach liquor. Then, the leach liquor may be injected with caustic so as to convert iron chloride to iron oxide. If there is ferrous iron present, air may be introduced into the pregnant leach liquor to form iron oxide.

We claim:

1. Method of recovering metal values from ocean floor nodules comprising:
   (A) contracting said nodules with hydrogen chloride gas to obtain metal chlorides, including iron chloride, as reacting products;
   (B) contacting said reaction products with water so as to convert said iron chloride to iron oxide;
   (C) leaching said reaction products with water, so as to obtain a pregnant leach liquor and separating the leach liquor from insoluble solid residue comprising ore residue and iron oxide;
   (D) contacting the pregnat leach liquor with a liquid ion exchange reagent selective for one of the metals, so as to extract said metal into the reagent leaving a raffinate solution, then stripping said isolated metal into an aqueous solution from said organic solution; and
   (E) cathodically electroplating said isolated metal in solution, so as to win said isolated metal.

2. Method of recovering metal values from ocean floor nodules comprising:
   (A) contacting said nodules with hydrogen chloride gas to obtain as reaction products:
      (i) iron chloride;
      (ii) copper chloride;
      (iii) cobalt chloride;
      (iv) nickel chloride; and
      (v) divalent manganese chloride;
   (B) contacting said reaction products, with water so as to convert said iron chloride to iron oxide;
   (C) leaching said reaction products with water, so as to obtain a pregnant leach liquor and separating the leach liquor from insoluble solid residue comprising ore residue and iron oxide;
   (D) contacting the pregnant leach liquor with a liquid ion exchange reagent selective for one of the metals, so as to extract said metal into the exchange reagent leaving a raffinate solution; then stripping said isolated metal into an aqueous solution from said exchange reagent and,
   (E) cathodically electroplating said isolated metal in solution, so as to win said isolated metal.

3. Method according to claim 2 wherein the water contacted with said reaction products is vapor.

4. Method of recovering metal values from ocean floor nodules as in claim 3 wherein the pH of the water during leaching is sufficient to dissolve said copper chloride and wherein the pregnant leach liquor is contacted with a liquid ion exchange reagent selective for copper so as to extract copper in organic solution while leaving an aqueous solution containing manganese, cobalt and nickel.

5. The process of claim 4 comprising adjusting the raffinate solution to a pH 3.5 to 5.5, injecting the raffinate solution with a liquid ion exchange reagent for nickel and cobalt so as to extract nickel and cobalt into the liquid ion exchange solution leaving a raffinate solution containing manganese; selectively stripping nickel and cobalt from the liquid ion exchange solution to form seprate aqueous solutions of nickel and cobalt; and cathodically electroplating each of said solutions to win respectively nickel and cobalt; the selective stripping of the nickel and cobalt comprising:
   (1) stripping nickel from the liquid ion exchange reagent with an aqueous solution generated during the cathodic electroplating of nickel, to which has been added 3 to 20% hydrochloric acid,
   (2) stripping cobalt from the liquid ion exchange reagent with concentrated hydrochloric acid, extracting cobalt from the concentrated hydrochloric acid with tri-isooctyl amine solution, and
   (3) stripping cobalt from the tri-isooctyl amine solution by contacting the solution with an aqueous solution derived during the cathodic electroplating of cobalt and removing manganese from the raffinate solution.

6. Method of recovering metal values from ocean floor nodules as in claim 5, including purifying said raffinate containing manganese by sulfide precipitation.

7. Method of recovering metal values from ocean floor nodules as in claim 5, wherein said removing of manganese is by evaporating and cooling so as to crystallize manganese chloride.

8. Method of recovering metal values from ocean floor nodules as in claim 5, including adjusting said raffinate solution pH so as to extract nickel and cobalt in the same proportions as they exist in the pregnant leach liquor.

9. Method of recovering metal values from ocean floor nodules as in claim 5, including varying the pH of said raffinate solution containing nickel and cobalt, so as to extract nickel and cobalt in any desired proportions regardless of their quantities in solution.

10. Method of recovering metal values from ocean floor nodules as in claim 4, wherein said stripping of copper from said liquid ion exchange reagent is by acid.

11. Method of recovering metal values from ocean floor nodules as in claim 3 wherein the temperature of the reaction mass during contact with hydrogen chloride gas is in the range of 110 to 600° C. for a period of 15 to 60 minutes.

12. Method in accordance with claim 3 wherein the temperature of the reaction mass during contact with water vapor is within the range 200 to 400° C.

13. Method of recovering metal values from ocean floor nodules as in claim 3, including directing said water vapor against said reaction products in a stream of chlorine.

14. Method of recovering metal values from ocean floor nodules as in claim 3, including directing said water vapor in a stream of air.

15. Method of recovering metal values from ocean nodules as in claim 3, including:
   (I) venting chlorine gas as a reaction product, while directing said water vapor in a stream of chlorine.

16. Method of recovering metal values from ocean floor nodules as in claim 2, including:
   (J) comminuting said nodules to approximately 100 mesh prior to flowing of said hydrogen chloride gas.

17. Method of recovering metal values from ocean floor nodules as in claim 2, wherein said liquid ion exchange reagent is organic.

18. Method of recovering metal values from ocean floor nodules comprising:
   (A) flowing hydrogen chloride gas against said nodules to obtain as reaction products:
       (i) iron chloride;
       (ii) copper chloride;
       (iii) cobalt chloride;
       (iv) nickel chloride; and
       (v) divalent manganese chloride;
   (B) leaching said reaction products with water, so as to obtain a pregnant leach liquor;
   (C) injecting caustic into said pregnant leach liquor, so as to convert said iron chloride to iron oxide and separating the leach liquor from insoluble solid residue comprising ore residue and iron oxide;
   (D) injecting the pregnant leach liquor with a liquid ion exchange reagent for one of the metals, so as to isolate said metal in an organic solution while leaving a raffinate solution, then stripping said isolated metal into an aqueous solution from said organic solution; and
   (E) cathodically electroplating said isolated metal in solution, so as to extract said isolated metal from solution.

19. Method of recovering metal values from ocean floor nodules, comprising:
   (A) flowing hydrogen chloride gas against said nodules to obtain as reaction products:
       (i) iron chloride;
       (ii) copper chloride;
       (iii) cobalt chloride;
       (iv) nickel chloride; and
       (v) divalent manganese chloride;
   (B) leaching said reaction products with water, so as to obtain a pregnant leach liquor;
   (C) injecting air as an oxidizing agent into said pregnant leach liquor, so as to convert said iron chloride to iron oxide and separating the leach liquor from insoluble solid residue comprising ore residue and iron oxide;
   (D) injecting the pregnant leach liquor with a liquid ion exchange reagent for one of the metals, so as to isolate said metal in an organic solution while leaving a raffinate solution, then stripping said isolated metal with an aqueous solution from said organic solution; and
   (E) cathodically electroplating said isolated metal in solution, so as to extract said isolated metal from solution.

References Cited
UNITED STATES PATENTS 3,169,856   2/1965   Mero _____ 75—121

GERALD L. KAPLAN, Primary Examiner

R. L. ANDREWS, Assistant Examiner

U.S. Cl. X.R.

75—113, 177, 119, 121, 101 BE; 204—107, 113; 423—24, 139, 140

UNITED STATES PATENT OFFICE
CERTIFICATE OF CORRECTION

Patent No. 3,752,745               Dated August 14, 1973

Inventor(s) W. S. Kane et al

It is certified that error appears in the above-identified patent and that said Letters Patent are hereby corrected as shown below:

On the third page of the patent, column 6, claim 1, line 36, please correct the word "contracting" to read --contacting--

On the fourth page of the patent, column 7, claim 15, line 66, please insert following "ocean", the word --floor--

Signed and sealed this 23rd day of July 1974.

(SEAL)
Attest:

McCOY M. GIBSON, JR.                C. MARSHALL DANN
Attesting Officer                   Commissioner of Patents